United States Patent [19]

Huang

[11] Patent Number: 5,403,612
[45] Date of Patent: Apr. 4, 1995

[54] PROCESS FOR PRODUCING A PHOSPHORYLATED PECTIN-CONTAINING FIBER PRODUCT

[75] Inventor: Emil A. Huang, Fridley, Minn.

[73] Assignee: Humanetics Corporation, Chaska, Minn.

[21] Appl. No.: 40,926

[22] Filed: Mar. 31, 1993

[51] Int. Cl.⁶ ............................................. A23L 1/0524
[52] U.S. Cl. .................................... 426/577; 426/658
[58] Field of Search ................................ 426/577, 658

[56] References Cited

U.S. PATENT DOCUMENTS

| | | | |
|---|---|---|---|
| 2,117,100 | 5/1938 | Milas | 204/31 |
| 2,132,065 | 10/1936 | Wilson | 426/577 |
| 2,531,431 | 12/1950 | Hills | 99/100 |
| 2,572,923 | 10/1951 | Gaver et al. | 260/209 |
| 3,676,158 | 7/1972 | Fischer et al. | 99/168 |
| 3,966,984 | 6/1976 | Cocke et al. | 426/472 |
| 3,973,051 | 8/1976 | Buckley et al. | 426/577 |
| 3,982,003 | 9/1976 | Mitchell | 426/577 |
| 4,520,017 | 5/1985 | Tunc | 514/54 |
| 4,824,672 | 4/1989 | Day | 424/195 |
| 4,857,331 | 8/1989 | Shaw et al. | 424/195 |
| 4,950,687 | 8/1990 | Yang et al. | 514/777 |
| 5,068,109 | 11/1991 | Foldager et al. | 424/441 |
| 5,118,510 | 6/1992 | Kuhrts | 424/451 |

FOREIGN PATENT DOCUMENTS

| | | |
|---|---|---|
| 2283907 | 9/1974 | France . |
| 2177100 | 6/1986 | United Kingdom . |
| 91/04674 | 9/1990 | WIPO . |
| 91/15517 | 5/1991 | WIPO . |

OTHER PUBLICATIONS

Phosphates in Food, Ricardo A. Molins, Ph.D., CRC Press, p. 190.

Camire and Clydsdale, Effect of pH and Heat Treatment on the Binding of Calcium Magnesium, Zinc, and Iron to Wheat Bran and Fractions of Dietary Fiber, vol. 46, pp. 548–551 (1981), *Journal of Food Science.*

Anderson et al., Dietary Fiber and Coronary Heart Disease, vol. 29, Issue 2, pp. 95–147, (1990), *Food Science and Nutrition.*

Colloidal Dispersions: Polysaccharide Gums, p. 169, *Encyclopedia of Food Science.*

Hoagland and Pfeffer, Cobinding of Bile Acids to Carrot Fiber, vol. 35, pp. 316–319 (1987), *J. Agric Food Chem.*

Hoagland and Pfeffer, Role of Pectin in Binding of Bile Acids to Carrot Fiber, Chapter 20 (1986), *American Chemical Society.*

Hoagland, Binding of Dietary Anions to Vegetable Fiber, vol. 37, No. 5, pp. 1343–1347 (1989), *J. Agric. Food Chem.*

Hoagland and Fishman, Interactions of Calcium Pectate with Phytate, AGFD No. 74.

Cellulose, vol. 4, pp. 593–614, Kirk-Othmer, *Encyclopedia of Chemicals.*

Abstract, Why Carrots may Reduce Cholesterol, 27 Jun. 1987.

Hoagland, et al., ACS Symp., Series 1986, 310 266–274 Chemical Abstracts vol. 105, 1986, Abstract 113884W.

Lopez, Canning of Vegetables, 10th Ed., pp. 340–341, *A Complete Course in Canning.*

Lopez, Vegetables, 8th Ed., pp. 84–85, *A Completer Course in Canning.*

McFeeters, Pectin Methylation Changes and Calcium Ion Effects on the Texture of Fresh, Fermented, and Acidified Cucumbers, pp. 217–230, (1986) *Chemistry and Function of Pectins.*

Owens, et al., Methods Used at Western Regional Research Laboratory for Extraction and Analysis of Pectic Materials, Jun. 1952.

Gelatin Characteristics of Acid-Precipitated Pectin From Sunflower Heads, F. Sosulski, *Can. Inst. Food Sci. Technol. J.,* vol. II, No. 3, Jul. 1978.

Extraction and Physicochemical Characterization of Pectin from Sunflower Head Residues, A. Miyamoto and K. C. Chang *Journal of Food Science,* vol 57, No. 6, 1992.

*Primary Examiner*—Jeanette Hunter
*Attorney, Agent, or Firm*—Faegre & Benson

[57] ABSTRACT

A process for producing a low-cost, crude, human-consumable, pectin-containing fiber possessing the gelling effect of fully refined pectin by treating the fiber with a dissociable phosphate reactant, removing excess water from the treated fiber, and drying.

16 Claims, No Drawings

PROCESS FOR PRODUCING A PHOSPHORYLATED PECTIN-CONTAINING FIBER PRODUCT

FIELD OF THE INVENTION

The invention broadly relates to processes for producing pectin and the resultant pectin product. Specifically, the invention relates to methods for producing a low-cost, pectin-containing product having the gelling effect associated with refined pectin with little syneresis.

BACKGROUND OF THE INVENTION

Pectin, along with cellulose, hemicellulose, and lignin, constitute the major components of plant tissue. The cellulose, hemicellulose and lignin portions are located within the cell structure where they provide support to the cell. The pectic portion is located between cells where it acts as a biological adhesive to hold the cells together.

Pectin is a water soluble, branched polysaccharide consisting of D-galacturonate units joined by α-1,4 glycosidic bonds interrupted with 1,2 L-rhamnose residues. The neutral sugars D-galactose, L-arabinose, D-xylose, and L-fucose form side chains from the α-1,4 glycosidic backbone. The α-1,4 glycosidic backbone includes about 5–10% by weight methylated carboxyl groups and about 5–10% by weight alpha acetyl groups. The molecular weight of pectin varies greatly from about 20,000 for sugar beet pectin up to about 200,000 for apple and citrus pectins.

Refined pectin is generally extracted from plant tissue, such as citrus pulp, by (i) treating the plant tissue with an acid (pH less than about 2) or base (pH greater than about 10) until the pectin component of the tissue is separated from the other components, (ii) solubilizing the free pectin, (iii) separating the pectin-containing liquid from the pectin-depleted solids, and (iv) precipitating the pectin by addition of a hydrocarbon precipitating agent, such as an alcohol.

Refined pectin is widely used in the food industry as a gelling agent. However, the high cost of refined pectin has limited the extent to which pectin is used. While the pectin-producing industry has long recognized the need for a low-cost, food-grade pectin product, efforts to produce such a crude pectin product has meet with limited success.

Grindsted (PCT Publication 91/15517) discloses a gelling composition comprising a crude fiber, such as carrot fiber, which has been (i) heat treated with acid, such as hydrochloric acid, at a pH of about 1–3 to convert insoluble pectin in the fiber to soluble pectin, (ii) treated with a base, such as calcium hydroxide, to increase the pH of the fiber to about 3–8, and then (iii) dried by evaporative methods to form a dry, pectin-containing fiber product.

While the process of Grindsted is significantly less expensive that the process used to produce fully refined pectin, the Grindsted process is slow (requires the fiber to be treated with an acid for several hours to achieve appreciable conversion of the pectin), requires the use and disposal of substantial quantities of environmentally hazardous acids, and requires the use of a considerable amount of energy to evaporatively dry the pH treated fiber.

Accordingly, a substantial need still exists for a simple, low-costs environmentally-friendly method for producing a pectin-containing fiber product possessing the gelling characteristic of refined pectin.

SUMMARY OF THE INVENTION

We have discovered an environmentally-friendly process for producing a low-cost, human-consumable, pectin-containing fiber product possessing the gelling effect of fully refined pectin with low syneresis.

The process includes the steps of treating an edible pectin-containing fiber with a dissociable phosphate and then removing water from the treated fiber to form a dry, storage stable, pectin-containing fiber product possessing surprising viscosity building properties.

Treatment of the fiber with the phosphate must be conducted at a pH of between about 6.5 to 9 with a ratio of available phosphate anions to fiber of at least 0.1 micromoles of available phosphate anions to gram of fiber.

DETAILED DESCRIPTION OF THE INVENTION INCLUDING A BEST MODE

Definitions

As utilized herein, the term "chemically coupled" refers to the covalent and noncovalent bonding of molecules and includes specifically, but not exclusively, covalent bonding, electrostatic bonding, hydrogen bonding and van der Waals' bonding.

As utilized herein, the terms "edible" and "dietary" refer to material suitable for human consumption.

As utilized herein, the term "enhance" means to add, increase, improve and/or intensify.

As utilized herein, the term "fiber material" refers to materials comprised substantially of substances which are not fully digested in the human digestive tract. Typical fiber materials include cellulose, hemicellulose, lignin and pectic material.

As utilized herein, the phrase "initial step" refers to a step which is performed prior to all other enumerated steps.

As utilized herein, the terms "ion" and "ionic state" refer to an atom or group of atoms that carry a positive or negative electric charge as a result of having lost or gained one or more electrons.

As utilized herein, the term "pectic material" is employed as a collective designation to refer to protopectin, pectin, pectinate, pectic acid and pectate.

As utilized herein, the term "pulp" refers to that portion of a fruit or vegetable which remains after removal of the juice from the fruit/vegetable and typically includes various ratios of cellulose, hemicellulose, lignin, pectic material, and other water insoluble materials.

As utilized herein, the term "saturate" means to contact a solid with sufficient liquid that the entire surface area of the solid accessible to the liquid is contacted by the liquid. In other words, any further increase in the volume of liquid would produce substantially no additional increase in surface contact between the liquid and the solid.

"Brookfield Viscosity" of the pectin-containing fiber product of this invention is measured using an LV #3 spindle at an rpm of 3.

Fiber Material

The major constituents of typical dietary fiber include cellulose, hemicellulose, lignin, and pectic. The cellulose, hemicellulose and lignin portions are located within the cell structure where they provide support to the cell. The pectic portion is located between cells where it acts as a biological adhesive to hold the cells together.

Cellulose $(C_6H_{10}O_5)_n$ is one of the major polysaccharides of plants where it provides structure to the plant cells. Cellulose is the most abundant organic compound in the biosphere, comprising more than half of all organic carbon. Cellulose is a highly stable, water insoluble, unbranched polysaccharide consisting of glucose units joined by $\beta$-1,4 glycosidic bonds. Sequential glucose units are rotated 180° to permit hydrogen bonding of the ring oxygen of one glucose unit to the 3-OH group of the subsequent unit. Mammals are not capable of synthesizing cellulases and therefore cannot digest cellulose. However, some ruminants, such as cattle, harbor intestinal cellulase-producing bacterial which permit the digestion of cellulose by these mammals.

Hemicelluloses, despite the name, are carbohydrate polymers which have no chemical relation to cellulose. The name arose because these polysaccharides are commonly associated with cellulose. Typical hemicelluloses include arabin and galactin. Like cellulose, mammals are not capable of synthesizing the enzymes necessary to digest hemicellulose.

Lignin is a water insoluble polysaccharide composed of coniferyl, p-coumaryl and sinapyl alcohols in varying ratios dependent upon the plant species. Lignin joins with cellulose and hemicellulose to provide structure to the cell wall.

Pectin is a water soluble, branched polysaccharide consisting of D-galacturonate units joined by $\alpha$-1,4 glycosidic bonds interrupted with 1,2 L-rhamnose residues. The neutral sugars D-galactose, L-arabinose, D-xylose, and L-fucose form side chains from the $\alpha$-1,4 glycosidic backbone. The $\alpha$-1,4 glycosidic backbone includes about 5–10% by weight methylated carboxyl groups and about 5–10% by weight alpha acetyl groups. The molecular weight of pectin varies greatly from about 20,000 for sugar beet pectin up to about 200,000 for apple and citrus pectins.

Sources of dietary fiber suitable for use as the raw material in my process include specifically, but not exclusively, fruits such as apples, oranges, and grapefruit; vegetables such as carrots, corn, peas and sugar beets; grains such as barley, oats, rice and wheat; and grasses such as sugar cane. The preferred raw materials are those which include at least about 5% and most preferably at least about 10% pectic materials.

Treatment Process

Particle Size Reduction

The particle size of the fiber is reduced to increase the surface area of the fiber available for treatment with a phosphate.

A wide variety of both wet and dry mills are available for achieving the desired size reduction of the fiber material. One type of mill capable of providing the desired size reduction is a disintegrator. A detailed discussion of the function, design, selection and operation of mills is provided in Perry & Chilton, *Chemical Engineers Handbook*, 5th Ed., pp. 8-35 to 8-42, which is hereby incorporated by reference.

The fiber material is preferably wet milled in order to avoid the dust control problems associated with dry milling of plant fibers.

The fiber material should be milled to a particle size capable of passing through a 10 mesh screen. Particles of greater than about 10 U.S. mesh decrease the rate at which the fiber is phosphorylated due to reduced surface area and frequently leaves a portion of the fiber unreacted.

Phosphorylation

The milled fiber is then treated with a reactant(s) capable of dissociating in water to provide free phosphate anions. The fiber possesses the desired gelling capacity with little syneresis when phosphorylated at a pH of about 6.5 to 9, preferrably a pH of about 7 to 8.5. Fiber phosphorylated at a pH of less than about 6.5 does not exhibit the surprising gelling effect to the extent obtained at higher pHs while fiber phosphorylated at a pH of greater than about 9 exhibits the surprising gelling effect but is unacceptably discolored and possesses an off-flavor. In addition, treatment of the fiber at a pH of greater than 9 adds unnecessary expense to the process as the highly basic effluent must be recycled or treated prior to disposal.

Reactants suitable for use as the source of phosphate anions include any electrolyte including a dissociable phosphate anion including specifically, but not exclusively, the hydrated and anhydrous forms of disodium phosphate, sodium metaphosphate, sodium tripolyphosphate, sodium trimetaphosphate, tetrasodium pyrophosphate and sodium polymetaphosphate.

Saturation of the fiber material with about a 0.01N to about 2N aqueous solution of the phosphate-containing electrolyte for about one minute to two hours (based upon reaction temperature), preferably about 15 to 30 minutes, at a temperature of about 4°–100° C., preferably about 70°–100° C., will typically result a pectin-containing product possessing the desired gelling and syneresis characteristic.

A beneficial gelling effect with low syneresis is obtained with a treatment ratio of available phosphate anions to fiber as low as 0.1 micromoles of available phosphate anions to gram of fiber. The preferred ratio of available phosphate anions to fiber is about 0.3 to 0.4 micromoles of available phosphate anions to gram of fiber.

Reaction temperature has been found to significantly affect the speed of the reaction. Generally, the reaction proceeds too slowly to be of practical use at temperatures less than about 4° C. while temperatures above about 100° C. result in flashing of water from the slurry.

The reaction can be conducted at temperatures above about 100° C. by performing the reaction under sufficient pressure to prevent flashing. While the use of treatment temperatures between about 100° to 150° C. would require the use of equipment capable of handling such elevated temperatures and pressures, such as a scrape surface heat exchanger, steam injector, steam infusion system, etc., the use of such elevated temperatures can reduce the reaction time to less than about 1 minute and in many instances to less than about 10 seconds.

Drying

The pectin-containing fiber product may then be dried to a storage stable water content of less than about 8 wt % by any of the conventional drying techniques such as vacuum drying, freeze drying, drum drying, oven drying, etc.

The dried pectin-containing fiber product may optionally be milled again to further reduce the particle size of the product and produce a finely powdered flour.

The resultant product is a phosphorylated pectin-containing fiber product comprised primarily of the dietary fibers cellulose, hemicellulose, lignin and pectic materials which is effective as a gelling agent in foodstuffs and which exhibits little to no syneresis.

EXPERIMENTAL

Experiment One

Several white grapefruit were washed with tap water, cut in half and juiced with an Oster Citrus Juicer, Model 4100-8A to yield one thousand thirty one grams of peel.

The peel was placed into an Osterizer (Galaxie) home style high speed mixer, diluted with three thousand fifty five grams of distilled water, and processed at the highest setting for one minute. The slurry was then divided into 500 gram test samples.

The test samples were treated with reagents as listed in Table One. The reagents were added to the test sample until the recorded pH was obtained. The number of moles of $Na_2HPO_4$ added to the test sample in Run #7 was calculated and equivalent amounts of $Na_{15}P_{13}O_{67}$ (based upon available phosphate anions) added in Runs #8 and #9.

The treated samples were placed under constant agitation using a CAFRAMO model RZR-1 mechanical stirrer and heated to 180° F. for five minutes. The samples were then processed with the Osterizer mixer at the lowest setting for one minute, cooled in a cold water bath, and placed in a refrigerator maintained at 40° F.

Seventeen hours after placing the treated samples in the refrigerator the samples were removed, visually inspected for color and syneresis, processed with the Osterizer mixer at the lowest setting for thirty seconds, and tested for viscosity using a Brookfield Digital Viscometer, Model DV-II. The test results and visual observations for each test sample are set forth in Table One.

The color of the visually inspected sample was recorded using the observation chart set forth below:

| Value | Description |
|---|---|
| 0 | No color change relative to control. |
| 1 | Slightly darker than control. |
| 2 | Moderately darker than control. |
| 3 | Significantly darker than control. |

Similarly, the syneresis of the visually inspected sample was recorded using the observation chart set forth below:

| Value | Description |
|---|---|
| 0 | No change relative to control. |
| 1 | Slight syneresis. |
| 2 | Moderate syneresis. |
| 3 | Significant syneresis. |

TABLE ONE

| Sample | NaOH | KOH | $Na_2HPO_4$ | $Na_{15}P_{13}O_{67}$ | pH | Viscosity (cp) | Color Syneresis |
|---|---|---|---|---|---|---|---|
| Control | | | | | 4.8 | Too Low | Reference |
| 1 | ✓ | | | | 6.0 | Too Low | 0/0 |
| 2 | ✓ | | | | 6.8 | 6,210 | 0/0 |
| 3 | ✓ | | | | 7.5 | 8,620 | 1/1 |
| 4 | ✓ | | | | 8.5 | 35,400 | 3/3 |
| 5 | | ✓ | | | 7.0 | 26,900 | 2/0 |
| 6 | | ✓ | | | 7.5 | 27,700 | 3/3 |
| 7 | | | ✓ | | 7.5 | 36,200 | 1/1 |
| 8 | | | | ✓ | 6.8 | 17,500 | 0/0 |
| 9 | ✓ | | | ✓ | 7.5 | 12,700 | 0/0 |

I claim:
1. A process for manufacturing a phosphorylated pectin-containing fiber product, comprising the steps of:
   (a) treating an edible pectin-containing fiber with a source of phosphate anions at a pH of between about 6.5 to 9 and a ratio of dissociable phosphate anions to fiber of at least 0.1 micromoles phosphate to gram of fiber so as to phosphorylate the fiber, and
   (b) removing water from the treated fiber to form a dry, storage stable, phosphorylated pectin-containing fiber product.
2. The process of claim 1 further comprising the initial step of dispersing the fiber in water to form an aqueous slurry.
3. The process of claim 1 wherein the step of treating edible pectin-containing fiber comprises treating edible fiber comprising at least 5 wt % pectate materials.
4. The process of claim 1 wherein the step of treating edible pectin-containing fiber comprises treating edible fiber comprising at least 10 wt % pectate materials.
5. The process of claim 1 wherein the step of treating edible pectin-containing fiber comprises the step of treating fiber obtained from a food selected from the group consisting of apples, barley, carrots, corn, grapefruit, oats, oranges, peas, rice, sugarbeet, sugar cane, and wheat.
6. The process of claim 1 wherein the step of treating edible pectin-containing fiber with a source of phosphate anions comprises the step of treating the fiber with a phosphate anion source selected from disodium phosphate, sodium metaphosphate, sodium tripolyphosphate, sodium trimetaphosphate and tetrasodium pyrophosphate.
7. The process of claim 1 wherein the edible pectin-containing fiber if treated with a source of phosphate anions at a pH of between about 7 to 8.5.
8. The process of claim 1 wherein the ratio of dissociable phosphate anions to fiber is about 0.3 to 0.4 micromoles phosphate per gram of fiber.
9. A process for manufacturing a phosphorylated pectin-containing fiber product, consisting essentially of the steps of:
   (a) treating an edible pectin-containing fiber with a source of phosphate anions at a pH of between about 6.5 to 9 and a ratio of dissociable phosphate anions to fiber of at least 0.1 micromoles phosphate to gram of fiber, and

(b) removing water from the treated fiber to form a dry, storage stable, phosphorylated pectin-containing fiber product.

10. The process of claim 9 further comprising the initial step of dispersing the fiber in water to form an aqueous slurry.

11. The process of claim 9 wherein the step of treating edible pectin-containing fiber comprises treating edible fiber comprising at least 10 wt % pectate materials.

12. The process of claim 9 wherein the edible pectin-containing fiber is treated with a source of phosphate anions at a pH of between about 7 to 8.5.

13. The product obtained by the process of claim 1.
14. The product obtained by the process of claim 8.
15. The product obtained by the process of claim 9.
16. The product obtained by the process of claim 12.

* * * * *